June 17, 1924.
E. HOPKINSON
1,497,751
CIRCULATORY PROCESS AND APPARATUS FOR CATALYTICALLY TREATING MATERIALS
Filed April 17, 1923
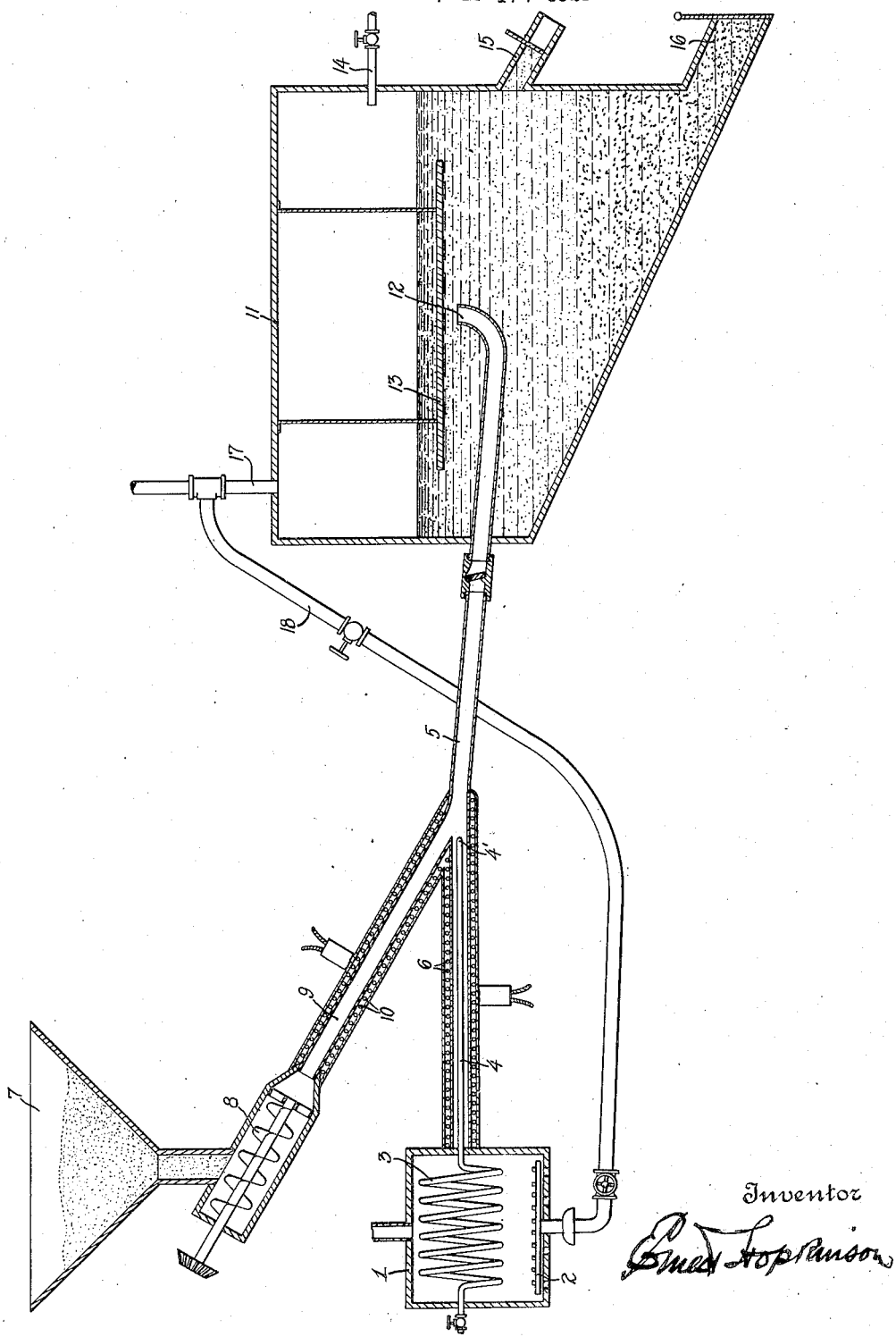
Inventor
Ernest Hopkinson Patented June 17, 1924.

1,497,751

UNITED STATES PATENT OFFICE.

ERNEST HOPKINSON, OF NEW YORK, N. Y.

CIRCULATORY PROCESS AND APPARATUS FOR CATALYTICALLY TREATING MATERIALS.

Application filed April 17, 1923. Serial No. 632,599.

*To all whom it may concern:*

Be it known that I, ERNEST HOPKINSON, a citizen of the United States, and residing at New York city, county of New York, and State of New York, have invented certain new and useful Improvements in a Circulatory Process and Apparatus for Catalytically Treating Materials, of which the following is a full, clear, and exact description.

This invention relates to a circulatory process and apparatus for catalytically treating materials, more particularly as applied to the production of carbon black.

The use of carbon black for many purposes has become quite common, such as in the compounding of rubber, and in the making of printer's ink and pigments. While a number of methods are known for its manufacture, a large part of it has been obtained by the incomplete combustion of a hydrocarbon, more particularly natural gas, the carbon being deposited from the flame by the interposition of a cooling surface. This method is extremely wasteful, and only a very small percentage of the chemically combined carbon is obtained in the form of carbon black. If a hydro-carbon is heated to a high enough temperature it can of course be dissociated into its elements, and as an example, methane, when heated to about 1200° C. under a pressure of one atmosphere, is practically completely separated into carbon and hydrogen, but the elevated temperature required and other difficulties have prevented any extensive practical use of this method. It is known that the temperature required for this dissociation may be considerably reduced if the operation is conducted in the presence of certain catalytic agents, among which are palladium black, platinum black, reduced nickel, cobalt, copper, zinc, and iron. For example, the aliphatic saturated hydro-carbons in the presence of these agents readily undergo decomposition and dissociation at temperatures as low as 300° and 400° C.; and the action of platinum black on acetylene is quite marked at 150° C. However, a difficulty in the use of such catalysts lies in the fact that they quickly become coated with the carbon black, or else "poisoned" by various impurities such as sulphur in the hydro-carbon so that in a very short time their catalytic effect is greatly reduced or entirely overcome. This "poisoning" of catalysts in general by certain substances is a serious defect in their use.

An object of my invention is to provide a continuous or circulatory process for the treatment of materials by a finely divided catalyst.

Another object is to provide a catalytic process for the treatment of materials by which clogging and slowing up of the action of the catalyst is avoided.

Another object of my invention is to provide a simple and effective process for obtaining carbon black.

Still another object is to provide an improved catalytic process for dissociating hydro-carbons.

A further object is to provide a substantially continuous carbon black process by which the hydro-carbon and catalyst after reaction are rapidly withdrawn from the zone of treatment, the products separated, and the catalyst disposed for further use.

A still further object is to provide a simple and efficient apparatus for carrying out the process.

For a detailed disclosure of the nature and objects of the invention reference is had to the accompanying specification and drawing, in which latter the figure represents more or less diagrammatically one embodiment of an apparatus for carrying out the process as applied to the production of carbon black.

Referring to the drawing, the numeral 1 designates any suitable form of heater, which is provided in the present instance with a gas burner 2, and above the burner is disposed a coil or other suitable arrangement 3 for heating the hydro-carbon. Leading from the coil 3 is a discharge pipe 4 which extends for some distance into a passage way or pipe 5 and terminates in a nozzle 4' within the latter, the pipe 5 being surrounded by any suitable form of electric heating element 6 for additionally heating the hydro-carbon if necessary. The numeral 7 designates a hopper to which may be supplied any suitable catalyst in finely divided condition, and the catalytic material is fed from this hopper by a screw conveyor 8 to a pipe 9 leading into the pipe 5 slightly in advance of the discharge nozzle for the heated hydro-carbon. If necessary the catalytic material may be supplied in a preheated condition, and the pipe 9 is also provided with an electric heating element 10 for further heating the material if desired. Beyond the electric heating elements the pipe 5 leads into a tank or receptacle 11 and its discharge end 12 is upwardly turned and slightly spaced from a relatively large baffle plate 13 suspended within the tank. A washing and cooling material such as water is supplied to the tank 11 through the valve controlled pipe 14 in quantity sufficient to keep the baffle plate 13 submerged some distance below the surface. The pipe 5 is preferably provided with a suitable check valve for preventing backward flow of water from the tank 11. The tank 11 is also provided with a valve controlled outlet 15 for withdrawing the carbon and water sludge, and below the latter with a second valve controlled outlet 16 for withdrawing the catalytic material. Leading from the top of the tank is a pipe 17 for withdrawing the gaseous by-products such as hydrogen, and communicating with this pipe is a valve controlled pipe 18 which is connected to the gas burner 2 in the heater 1.

In carrying out the process as applied to the making of carbon black, any suitable carbon compound such as natural gas or a liquid hydro-carbon is supplied to the heating coil 3, from which it passes into the electrically heated pipe 4, the heating being governed so as to raise the temperature of the particular hydro-carbon used to an extent sufficient to cause its dissociation and dehydrogenation upon coming in contact with a suitable catalyst. The catalyst, which may be reduced nickel, cobalt, copper, or other suitable material, is supplied to the hopper 7, and as before stated if necessary it may be pre-heated. From the hopper it is fed by the conveyor 8 into the electrically heated pipe 9, and finally discharged into the heated pipe 5 adjacent the discharge nozzle 4' for the heated hydro-carbon. The heating of the hydro-carbon and catalyst may be accomplished solely by the use of the gaseous by-products or in any other suitable manner. Under the influence of the catalyst, which is intimately mingled in finely divided form with the hydro-carbon, the carbon is set free. If it should be attempted to pass hydro-carbon through a stationary mass or body of a finely divided catalyst the carbon set free deposits on the catalyst and the latter quickly becomes clogged and ineffective. Moreover, certain substances such as sulphur which occur as impurities in mineral hydro-carbons appear to have a detrimental effect on the catalyst and greatly reduce or impair its effect, which action is technically known as "poisoning". By the use of my process, however, a continuous stream of hydro-carbon is intimately mingled with and subjected to the action of a continuous stream of catalytic material, hence, each molecule of the hydro-carbon can be acted upon by freshly activated and clean catalytic material and the objectionable "poisoning" effect can not become cumulative. Moreover, the products formed and the catalytic material are rapidly carried out of the heated zone where the dissociation takes place and cooled by the discharge under water in the tank 11. The baffle plate 13 aids in the washing and separating of the carbon and the catalytic material as the particles pass beneath it along with the gaseous by-products, which latter then bubble to the surface of the liquid and may be drawn off through pipe 17. The carbon black, being light, forms a sludge with the water which may be drawn off from time to time through the outlet 15. The metallic catalyst being heavier settles to the inclined bottom of the tank and may be withdrawn from time to time through the outlet 16 and dried or otherwise prepared for return to the hopper 7 and subsequent re-use.

It will be seen that by my invention there is practically a continuous circulation of the catalyst, each particle of which acts only for a limited time on the hydro-carbon, is then freed from any attached carbon, treated if necessary to remove any "poisoning" effect caused by material such as sulphur, etc., in the hydro-carbon, and then again starts on a new cycle. Owing to the rapid expansion of the hydro-carbon as it is released from the discharge nozzle the hydro-carbon and catalytic material remain as before stated for only a very limited time in the heated reaction zone but are swept away from the same and into the cooling and separating chamber or receptacle. By reason of this action the carbon set free from the hydro-carbon is not allowed to deposit in the heated reaction zone and thereby become hardened and agglomerated.

While a specific embodiment of the process and of an apparatus for carrying out the same have been disclosed, it is evident that numerous modifications will suggest themselves to those skilled in the art, and the invention is applicable to the catalytic treatment of various materials. I believe that I am the first to make use of a catalytic dissociation process and apparatus by which the catalytic material may be continuously circulated to avoid the previously known defects of clogging and "poisoning", and I do not desire that the invention shall be limited otherwise than set forth in the appended claims.

Having thus described my invention, what I claim and desire to protect by Letters Patent is:

1. The circulatory process of catalytically dissociating materials which consists in intimately mingling the material and a catalyst in a reaction zone, rapidly withdrawing the mixture from said zone and separating the catalyst therefrom, and again mingling the catalyst with a further portion of the material.

2. The circulatory process of catalytically dissociating materials which consists in continuously and intimately mingling the material and a catalyst in a finely divided condition in a reaction zone, rapidly and continuously withdrawing the mixture from said zone and separating the catalyst therefrom, treating the latter to re-activate it, and again mingling it with a further portion of the material.

3. The process of producing carbon black which comprises freeing the carbon from a carbon compound by contact with a finely divided catalyst at dissociation temperature, and continuously removing and separating the carbon and catalyst.

4. The process of producing carbon black which comprises subjecting a continuous stream of a carbon compound to a continuous stream of a catalyst at dissociation temperature, and separating the freed carbon from the catalyst.

5. The process of producing carbon black which comprises subjecting a continuous stream of a carbon compound to a continuous stream of a catalyst at dissociation temperature, and separating the freed carbon and catalyst from the by-products by treatment with water.

6. The process of producing carbon black which comprises subjecting a continuous stream of a carbon compound to a continuous stream of a catalyst at dissociation temperature, separating the freed carbon and catalyst from the by products under water, and separating the carbon and catalyst by gravity.

7. The process of producing carbon black which comprises mixing a carbon compound with a finely divided catalyst in the presence of heat, continuously removing the mixture, and recovering the freed carbon and the catalyst.

8. The process of producing carbon black which comprises intimately mixing a carbon compound and a catalyst in the presence of heat, continuously removing the resultant products from the heat zone, and recovering the carbon black and catalyst from the same under water.

9. The process of producing carbon black which comprises treating a carbon compound with a catalyst in suspension, removing the products, and separating the carbon and catalyst from the by products.

10. The process of producing carbon black which comprises treating a carbon compound with a catalyst in suspension in the presence of heat, continuously removing the resultant products from the heat zone, and separating the carbon and catalyst from the by products.

11. The process of producing carbon black which comprises preheating a carbon compound, preheating a catalyst, intimately mingling the latter in suspension with the carbon compound in the presence of heat, rapidly withdrawing the materials from the heat zone, and separating the by products, carbon and catalyst by a water treatment.

12. The continuous catalytic process of producing carbon black which comprises supplying a finely divided catalyst to a hydro-carbon in the presence of heat, continuously withdrawing and separating the catalyst, freed carbon and by-products, and again supplying the catalyst to a further mass of the hydro-carbon.

13. An apparatus for producing carbon black comprising means for discharging a jet of hydro-carbon, means for supplying comminuted catalytic material to said jet to dissociate the hydrocarbon, and means for separating the dissociation products of the hydrocarbon from each other and from the catalyst.

14. An apparatus for producing carbon black comprising means for continuously mingling a hydro-carbon and a finely divided catalyst, means for heating them adjacent the mixing point, means for conducting the mixture from the mixing point, and means for recovering the catalyst and carbon from said mixture.

15. An apparatus for producing carbon black comprising a heated receptacle, means for discharging a heated carbon compound thereinto, means for supplying a heated catalyst to the receptacle to mix with the carbon compound, means for withdrawing the mixture, and means for washing and separating the catalyst, freed carbon and by products.

Signed at New York, county of New York, and State of New York, this 13th day of April, 1923.

ERNEST HOPKINSON.